United States Patent [19]

Gosset et al.

[11] Patent Number: 5,372,643
[45] Date of Patent: Dec. 13, 1994

[54] AGENT INCREASING THE RATE OF HARDENING OF CEMENTS, MORTARS AND CONCRETES WHILE MAINTAINING THEIR WORKABILITY

[75] Inventors: Serge Gosset, Lestrem; Didier Videau, Lille, both of France

[73] Assignee: Roquette Freres, Lestrem, France

[21] Appl. No.: 87,884

[22] Filed: Jul. 9, 1993

[30] Foreign Application Priority Data

Jul. 15, 1992 [FR] France .................. 92 08746

[51] Int. Cl.$^5$ .................................. C04B 24/12
[52] U.S. Cl. .................................. 106/808; 106/696; 106/727; 106/819; 106/823; 524/61
[58] Field of Search .............. 106/696, 727, 724, 819, 106/823, 713, 808; 524/61; C04B 24/12

[56] References Cited

U.S. PATENT DOCUMENTS

| | | |
|---|---|---|
| 4,373,956 | 2/1983 | Rosskopf . |
| 5,069,721 | 12/1991 | Tamura et al. ............... 106/713 |
| 5,232,497 | 8/1993 | Dillenbeck et al. .......... 106/808 |

FOREIGN PATENT DOCUMENTS 0415799 3/1991 European Pat. Off. .

*Primary Examiner*—Mark L. Bell
*Assistant Examiner*—Paul Marcantoni
*Attorney, Agent, or Firm*—Larson and Taylor

[57] ABSTRACT

The invention relates to an agent increasing the rate of hardening of cements, mortars and concretes while maintaining their workability. It also concerns an adjuvant for cements, mortars and concretes, comprising an effective quantity of said agent, and the cements, mortars and concretes comprising an effective quantity of said agent or said adjuvant. This agent corresponds to the formula

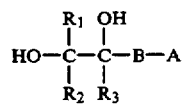

in which $R_1$, $R_2$ and $R_3$, which may be identical or different, denote the hydrogen atom or an alkyl, substituted alkyl, alkene, aryl or aralkyl group, B denotes a hydrocarbon chain containing at least one —$CH_2$— unit and in which the number of carbons situated in the chain is smaller than or equal to 10, A denotes the groups:

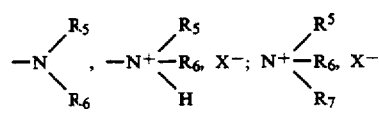

in which:

X denotes an organic or inorganic anion and in particular a halogen $R_5$, $R_6$ and $R_7$, which may be identical or different, denote alkyl, substituted alkyl, alkene, aryl or aralkyl radicals.

16 Claims, 3 Drawing Sheets

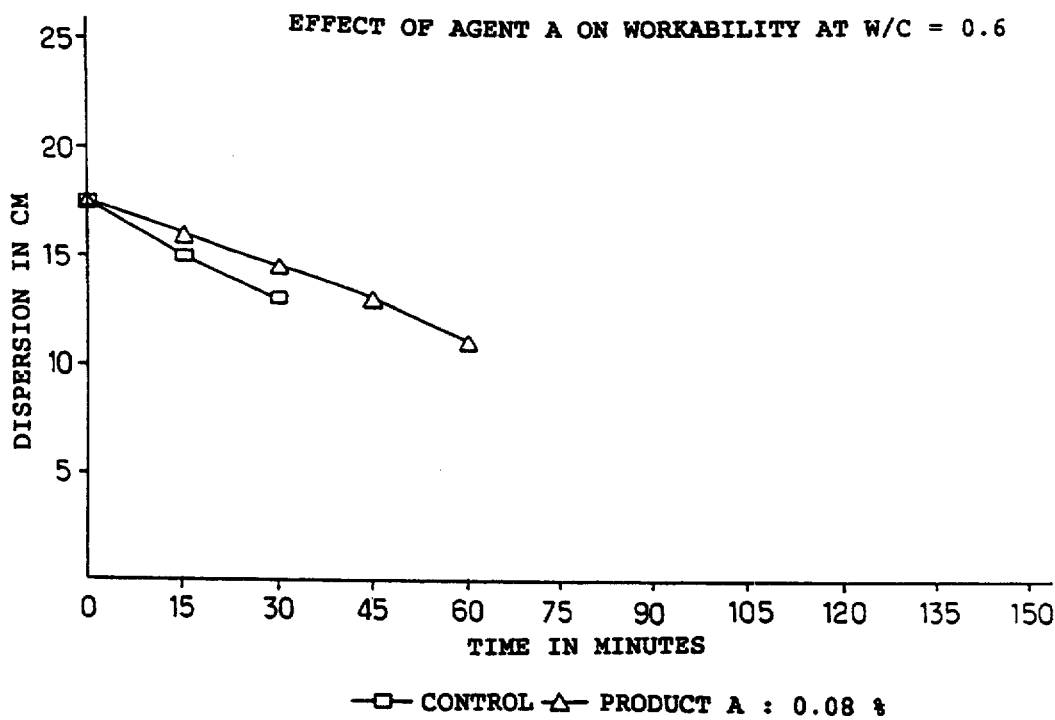
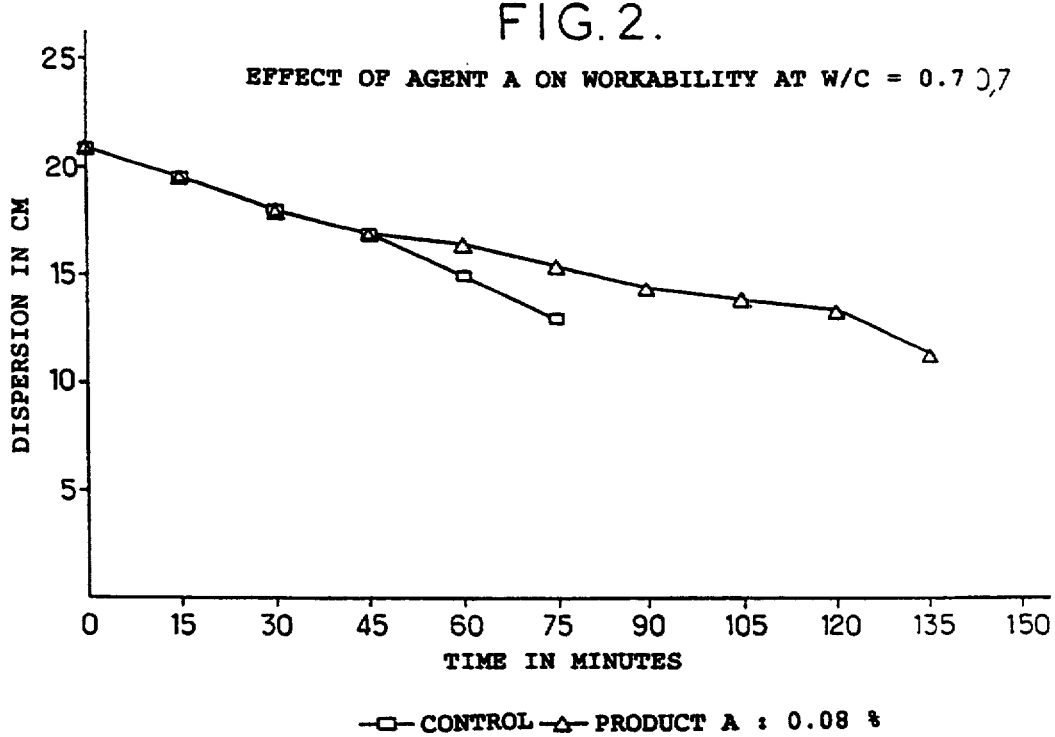

CHANGE IN WORKABILITY WITH TIME

PRINCIPLE OF THE MEASUREMENT OF PERMEABILITY

PERMEABILITY TEST ON 5 X 15 X 15 cm³ BLOCK OF A SLABBING CONCRETE

AGENT INCREASING THE RATE OF HARDENING OF CEMENTS, MORTARS AND CONCRETES WHILE MAINTAINING THEIR WORKABILITY

BACKGROUND OF THE INVENTION

1. Field of the Invention

The present invention relates to an agent increasing the rate of hardening of cements, mortars and concretes while maintaining their workability.

It also concerns an adjuvant for cements, mortars and concretes, comprising an effective quantity of said agent, together with the cements, mortars or concretes comprising an effective quantity of said agent or of said adjuvant.

Within the scope of the present invention a rate of hardening is intended to mean the time elapsing between the beginning and the end of setting of the cements.

The standardized measurement method used to obtain this rate of setting is based on the change, as a function of time, in the coefficient of penetration of the needle of a setting tester.

Still within the scope of the present invention, workability of the cements, mortars or concretes is intended to mean the ability to maintain a rheological state in which the cements, concretes and mortars can be handled, that is to say in particular can be poured or pumped without appreciable alteration in their other properties. What is wanted is that this workability should at least be maintained from the end of the mix until the time when the mortars and concretes are placed in position.

2. Related Art Statement

Portland cements, or their analogs, are known to endow mortars and concretes which contain them with high mechanical characteristics after hardening. However, as a result of their essential constituent, which is tricalcium aluminate, these cements result in an onset of setting and a setting time which are frequently judged to be too long in certain uses.

In fact, in the case of applications in the building trade field, attempts are made not only to extend the period for which the workability is maintained, but above all, every effort is made to meet the requirements of working rates at the work sites. As a result, it is imperative that, after approximately 16-17 hours following their being placed in position, in other words in what has conventionally become known as "early age", the concretes and mortars should have sufficient mechanical strength to permit various operations such as, for example, the removal of shuttering. Further, it is not inappropriate to emphasize that the performance required where mechanical strength after 16-17 hours is concerned is increasingly high.

Many products have been proposed as additives for mortars and concretes in order to improve their characteristics.

Thus, various setting accelerators have been proposed, these products being chosen especially from chlorides, sulfates, nitrates and others. However, it is now recognized that their use gives rise to other problems including in particular phenomena of corrosion of the metal reinforcements of reinforced concretes into which they are incorporated.

To try and meet the various requirements of the art, that is to say essentially to obtain an increase in the rate of hardening while maintaining good workability, it might have been envisaged to add such setting accelerators only at the time of the placing of the concretes or mortars in position, or only a few minutes before this operation. This would have made it possible to maintain good workability of the mortars and concretes while obtaining an acceleration in their rate of hardening and therefore a satisfactory strength in the early age. Nevertheless, resorting to this type of solution entails heterogeneities in the concretes and as a result gives rise to large differences where their mechanical strength is concerned.

It has also been envisaged to use, in combination with these additives which have an accelerating effect on setting, setting-retarding agents such as gluconates, the effect of the latter additives compensating or moderating the effect of the former. However, resorting to such mixtures results almost unavoidably in problems of false setting, which produce serious disadvantages at the time of the removal of shuttering from the concretes in the early age.

These disadvantages exhibited by the various solutions tested and employed according to the prior art were aggravated further by segregation or bleeding problems appearing when, in order to meet technical requirements, fluid mortars or concretes had been used, that is to say hydraulic binders with a water-to-cement (W/C) ratios higher than 0.5 and in most cases between 0.6 and 0.7.

Consequently, no agent or no adjuvant has so far made it possible to increase the rate of hardening of hydraulic binders so as to make it possible to obtain satisfactory mechanical strength approximately 16 to 17 hours after their being placed in position, without, however, detriment to their workability.

Now, the Applicant Company has had the merit of finding, at the outcome of numerous investigations, an agent which makes it possible to maintain or even to improve the workability while increasing the rate of hardening of cements, mortars and concretes.

DETAILED DESCRIPTION OF THE INVENTION

This agent is characterized in that it corresponds to the formula

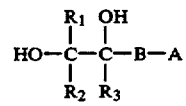

in which $R_1$, $R_2$ and $R_3$, which may be identical or different, denote the hydrogen atom or an alkyl, substituted alkyl, alkene, aryl or alkylaryl group, B denotes a hydrocarbon chain containing at least one —$CH_2$— unit and in which the number of carbons situated in the chain is smaller than or equal to 10, A denotes the groups:

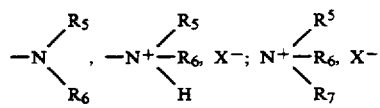

in which:

X denotes an organic or inorganic anion chosen from the group comprising ions of halogen, nitrate, nitrite, sulfate, sulfite, thiosulfate, acetate, adipate, citrate, gluconate, p-tosylate, formate, propionate, phosphate, borate, thiocyanate and sulfonate type, it being understood that ions of halogen type are preferred, $R_5$, $R_6$ and $R_7$, which may be identical or different, denote alkyl, substituted alkyl, alkene, aryl or alkylaryl radicals.

The hydrocarbon chain B may obviously contain substituents including expressly hydroxyl groups and halogenated groups.

According to a preferred embodiment the agent improving the workability and increasing the rate of hardening of cements, mortars and concretes corresponds to the formula

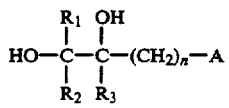

where
$R_1$, $R_2$, $R_3$ and A have the same meanings as those given above,
and where
$1 \leq n \leq 6$.

According to another preferred embodiment of the invention $R_1$, $R_2$ and $R_3$ denote $C_1$-$C_4$ alkyl radicals.

Still more preferably, the agent improving the workability and increasing the rate of hardening of cements, mortars and concretes corresponds to the following formula:

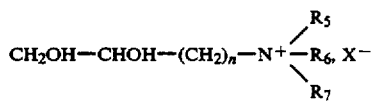

in which:
$R_5$, $R_6$ and $R_7$, which may be identical or different, are $C_1$-$C_4$ alkyl radicals,
$1 \leq n \leq 5$.

Independently of the fact that they accelerate the rate of hardening of the hydraulic binders into which they are introduced, the agents forming the subject of the present invention make it possible to increase, surprisingly and unexpectedly, and quite significantly, the mechanical strength of said hydraulic binders, this being not only in the early age but also after seven and twenty-eight days. In addition, they make it possible to maintain, or even to increase, the workability period of these hydraulic binders without, however, detriment to the other characteristics.

These very important advantages brought about by the agents in accordance with the invention are all the more marked when the hydraulic binders have a W/C ratio higher than 0.5 and preferably higher than 0.6. In fact, the agent in accordance with the invention make it possible to solve the segregation and bleeding problems encountered previously when using fluid mortars or concretes.

These advantages brought about where the workability is concerned, in particular in hydraulic binders which have a W/C ratio higher than 0.5, are all the more appreciated when the site where the concretes and mortars are placed in position is distant from the site of their manufacture, this giving rise to long travels or even to extended waiting periods.

Furthermore, it can be stressed that all the advantages conferred by the agents in accordance with the invention are obtained not only under normal climatic conditions but also at low or high temperatures.

The invention also concerns an adjuvant for cements, mortars and concretes, characterized in that it comprises an effective quantity of at least one agent as defined above. This adjuvant may be in dry or liquid form and, besides the agent in accordance with the invention may comprise various conventional additives for mortars and concretes such as, for example, water-reducing agents, setting-accelerating or retarding agents, anti-corrosion agents, aerating agents, fluidifying agents, plasticizers, chlorinated derivatives, optionally aminated epoxidized olefins or rheology modifiers of the cellulose derivative or acrylic derivative type. Most generally the adjuvant in question comprises from 10 to 95% by weight dry/dry, and preferably from 30 to 80% by weight, of at least one agent improving workability and increasing the rate of hardening of the cements, mortars and concretes in accordance with the invention.

The invention also concerns cement, mortar or concrete compositions comprising an effective quantity of at least one agent or of at least one adjuvant as defined above. "Effective quantity" is intended to mean a quantity of agent according to the invention (it being possible for this to be introduced by itself or within an adjuvant according to the invention) capable of imparting to the hydraulic binder into which it is introduced a rate of hardening which is higher than the rate of hardening that would be exhibited by a hydraulic binder of the same composition but free from any agent according to the invention.

These cement, mortar or concrete compositions most generally comprise a quantity of 0.001 to 2%, preferably from 0.01 to 1.5% and still more preferably from 0.015 to 1% by weight relative to the weight of cement of an agent in accordance with the invention, the quantities being expressed on a dry weight basis.

The agents or adjuvants in accordance with the invention can be introduced into the mortars or into the concretes which are dry and ready for use, or else at the time of their preparation with the mixing water. The invention therefore concerns in particular a mixing water intended for the preparation of mortars or concretes comprising an effective quantity of an agent according to the invention or of an adjuvant according to the invention.

They can also be added directly to the cements during the actual manufacture of the latter. They then form an integral part of said cements.

The agents or adjuvants in accordance with the invention can also be introduced partly at the time of the preparation of hydraulic binders and partly just before these hydraulic binders are put in place. They can also be introduced totally just before the hydraulic binders are put in place, although this is generally not preferred.

The agents in accordance with the invention can be prepared in a manner known per se. They can thus, in particular, be prepared by reaction, in a first stage, of a compound containing an epoxy functional group at one of its ends and, at the other end, a reactive group such as, for example, a halogen atom, with aqueous ammonia, an amine or with a product containing an amine functional group, and by reaction, in a second stage, of the product thus obtained with an alkaline agent, this second stage resulting in the hydrolysis of the epoxy functional group.

Thus, the agents in accordance with the invention can be prepared by reaction of an epihalohydrin, such as epichlorohydrin, with aqueous ammonia, primary, secondary and tertiary amines, followed by reaction of the products thus obtained with an alkaline agent such as sodium hydroxide in order to hydrolyze the epoxy functional group.

BRIEF DESCRIPTION OF THE DRAWINGS

FIGS. 1 and 2 show the effects of the agent according to the invention or workability at water/cement ratios of 0.6 to 0.7 respectively.

DESCRIPTION OF THE PREFERRED EMBODIMENTS

Figure 3:
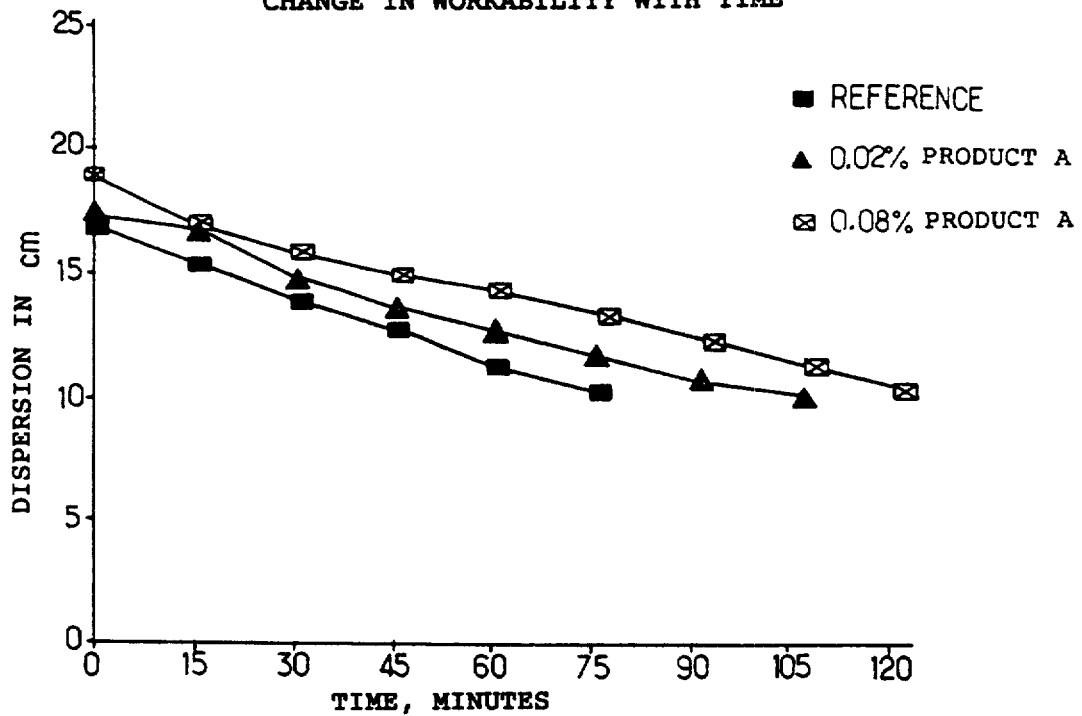
FIG. 3 shows the change in workability with time, obtained after the addition of different amounts of agent, as compared with a control mortar.

The invention will be capable of being better understood with the aid of the examples which follow and which are given either by way of comparison or in relation to advantageous embodiments.

EXAMPLE 1

Preparation of a Control Mix and of a Mix Containing Adjuvant, with a W/C Ratio=0.5.

450 g of cement of CPA 55 HTS reference, 225 g of drinking water and 1350 g of standardized sand (NF 15403) are mixed in the bowl of a Rilem mixer (marketed by the Perrier company and in accordance with ASTM C 305 standard) at speed of 140 revolutions/min for 30 seconds. Then, for 30 seconds, the mix stuck to the wall of the bowl is returned to the center of the latter, with the aid of the mixer paddle, and mixing at a rate of 280 revolutions/min is then resumed for 2 minutes. The wall of the bowl is scraped again and mixing is then resumed for 2 minutes at a rate of 280 revolutions/min.

When the adjuvants are added to the mortar with the aid of the products in accordance with the invention, good homogeneity is ensured by virtue of the predilution of the agents or adjuvants in accordance with the invention with the mixing water.

Preparation of an Agent A in Accordance with the Invention

The test agent, called A hereinafter, consists of 2,3-dihydroxypropyltrimethylammonium chloride which is obtained as follows: a dilution in distilled water containing 5% by weight of glycidyltrimethylammonium chloride (marketed, for example, by the Degussa company under the name Quab 188 or by the Dutch company C.F.Z. under the name Reagens-S-CFZ) is prepared in a 6-liter beaker, and sodium hydroxide is then added to this dilution in a proportion of 1% by weight of NaOH relative to the glycidyltrimethylammonium chloride.

The whole is then heated to 110° C. for 6 hours and is then neutralized to a pH of 5–6 by addition of hydrochloric acid.

The reaction mixture is then evaporated in an apparatus of the Rotovapor type to a solids content of approximately 88% in order to crystallize most of the NaCl formed, which is separated off by filtration on sintered glass.

Dispersion Measurements

These measurements are performed on an impact table consisting of a circular stainless steel tray and of a hammer and anvil system controlled by a counter, permitting one impact per second. Each impact corresponds to a drop from a 15-mm height. As soon as the mix prepared as described above is finished, a frustoconical stainless steel mold with a 100-mm diameter at the base, a 70-mm diameter at the top and 60 mm in height is filled. The mold thus filled is then placed in the middle of the circular tray of the impact table. The mold is then removed and the impact table is set in motion. After 15 seconds the impact table is stopped and the mean of 6 measurements of the dispersion slumped diameter of the collapsed mortar is calculated.

These measurements are performed at 20° C. and at a relative humidity of 65%.

After each measurement the mortar spread on the tray of the impact table is replaced in the bowl of the mixer, is left at rest for 15 minutes and is then mixed at a rate of 280 revolutions/min for 30 seconds. A dispersion test is then performed again. This same operation is repeated until the dispersed mortar has an appearance of wet earth, forms aggregates which fall apart and which no longer allow the diameter to be measured properly.

Dispersion measurements carried out according to the method described above were performed on a control mortar and on mortars with the addition of various quantities of product A in accordance with the invention. The percentages of added agent are expressed in dry weight relative to the weight of cement.

The results obtained are brought together in Table I.

TABLE I

|  | CONTROL | % PRODUCT A | | | | |
|---|---|---|---|---|---|---|
|  |  | 0.03 | 0.09 | 0.15 | 0.21 | 0.27 |
| T0 | 222 | 232.5 | 244 | 242 | 248 | 256 |
| 15 min | 210 | 216 | 229 | 227.5 | 231 | 237.5 |
| 30 min | 200 | 204 | 213 | 215.5 | 221 | 226 |
| 45 min | 190 | 194 | 206.5 | 207 | 214 | 220 |
| 1 h | 179 | 187 | 198 | 199 | 207 | 210 |
| 1 h 15 min | 176 | 178 | 187 | 189.5 | 201 | 205 |
| 1 h 30 min | 160 | 171 | 178 | 181 | 194 | 199 |
| 1 h 45 min |  | 160 | 168 | 175 | 187 | 191 |
| 2 h |  |  | 160 | 164 | 179 | 185 |
| 2 h 15 min |  |  |  | 160 | 169 | 175 |
| 2 h 30 min |  |  |  |  | 165 | 169 |
| 2 h 45 min |  |  |  |  | 160 | 164 |
| 3 h |  |  |  |  |  | 160 |

On reading these results it is found that the use of agents according to the invention makes it possible to increase the time during which the mortar remains fluid and workable, this happening even when the added quantities are small.

A mortar comprising an agent in accordance with the invention has a workability period which is much longer than a mortar to which such an agent is not added.

The use of the agents in accordance with the invention therefore permits a transportation period for the mortars which is much longer between the site of their manufacture and that of their use. It also makes it possible to work the mortars much longer without observing segregation and, finally, it makes it possible to maintain a perfectly homogeneous mix.

Measurement of the Setting Periods

To carry out this test, frustoconical molds, 40 mm in height, with a lower diameter of 80 mm and an upper diameter of 70 mm, oiled, are filled with the mix as prepared above.

These molds are placed at the base of an automatic setting tester marketed by the CERILH under the name Euromatest.

At regular intervals, that is to say every 15 minutes, a needle loaded with a one-kilogram weight enters the mortar until it meets the resistance offered by the bottom of the mold or the onset of setting of the mortar. The depth of entry is plotted directly on a graph.

The onsets of setting, ends of setting and hardening periods are measured both on a control mortar and on mortar compositions in accordance with the invention, that is to say containing agents or adjuvants according to the invention.

The values obtained are brought together in Table II.

TABLE II

|  | % | ONSET OF SETTING | END OF SETTING | HARDENING PERIOD |
| --- | --- | --- | --- | --- |
| Control | — | 4 h 05 min | 6 h 20 min | 2 h 15 min |
| Product A | 0.03 | 4 h 00 min | 5 h 45 min | 1 h 45 min |
|  | 0.09 | 4 h 00 min | 5 h 40 min | 1 h 40 min |
|  | 0.15 | 4 h 05 min | 5 h 50 min | 1 h 45 min |
|  | 0.21 | 4 h 20 min | 5 h 20 min | 1 h 00 |
|  | 0.27 | 4 h 35 min | 6 h 05 min | 1 h 25 min |

It may be concluded that, even in the case of the smallest quantities of product A, there is an increase in the rate of hardening of the mortars.

Moreover, however, it may be noted, on reading the results recorded in Table II, that the products according to the invention are not setting-retardant.

Mechanical Strength

To measure mechanical strength, test pieces are prepared in demountable clamping molds made of stainless steel comprising three horizontal compartments making possible the simultaneous preparation of three prismatic test pieces 40 mm × 40 mm in cross-section and 160 mm in length (EN 196.1 standard).

The mix described above is incorporated in the molds in the following manner: the molds, oiled beforehand, are half-filled and then secured to the center of the impact table already described. 60 shocks are performed, then the mold is filled completely and 60 shocks are performed again on the impact table. The surface of the molds is skimmed flat to remove the excess preparation. The test pieces are demolded after 17 hours to measure the strength in early age. In the case of the strength at 7 days and at 28 days the test pieces are demolded 24 hours after their preparation and are then stored at a temperature of 20° C. in moisture-saturated tanks in which they rest on a perforated metal grid.

To perform the mechanical strength measurements the test pieces are first of all broken on a flexural rupture measurement apparatus (marketed by Perrier) in accordance with the standards P15451-P15401.This device comprises two roller supports 10 mm in diameter, 100 mm apart, on which the test piece rests on a side molding face. A third roller of the same diameter, equidistant from the first two, transmits a load. The rupture is caused by the moment produced by the movement of this load.

The two test specimen pieces obtained on the flexural apparatus are then tested on a Perrier compression tester. The half test piece rests on a side molding face and is compressed over a 40 × 40 mm section by two metal plates 40 mm in width and more than 40 mm in length. The upper metal plate can be inclined to obtain a perfect contact with the test piece. The stress (in bars) needed for the compression rupture of the test piece is thus measured.

Measurements of the compressive strength of the test pieces to which products according to the invention have been added were thus performed. These test pieces were stored at 20° C. for 17 hours, 7 days and 28 days. The results obtained are brought together in Table III.

TABLE III

|  | CONTROL | % PRODUCT A | | | | |
| --- | --- | --- | --- | --- | --- | --- |
|  |  | 0.03 | 0.09 | 0.15 | 0.21 | 0.27 |
| Strengths at 17 h | 60 | 98.5 | 112 | 113 | 132 | 127 |
| Strengths at 7 d | 324 | 389 | 401 | 417 | 455 | 399 |
| Strengths at 28 d | 469 | 483 | 525 | 522 | 519 | 504 |

Treatment of the mortar with adjuvant using the product A in accordance with the invention thus makes it possible, by a significant increase in the rate of hardening, to increase the strength in early age in a highly significant manner when compared with the adjuvant-free control, the main consequence of this being to allow the shuttering to be removed from the structure much earlier. This is all the more advantageous since the strengths obtained at 7 days and 28 days with the mortar containing products according to the invention as additives are also markedly higher than those of the control. The use of the agents in accordance with the invention therefore allows a much greater efficiency, owing to a significant increase in the rate of hardening, which is reflected in a much faster removal of shuttering and which makes it possible to obtain a much stronger finished structure.

The test pieces produced with the mortars in accordance with the invention were also stored at 5° C. under the same conditions as those described above. Similarly, the strengths at 17 hours were then measured. The values obtained are brought together in Table IV below.

TABLE IV

|  | CONTROL | % PRODUCT A | |
| --- | --- | --- | --- |
|  |  | 0.03 | 0.07 |
| Strengths at 17 h | 8 | 13.5 | 20 |

It is therefore concluded that, by virtue of the agent according to the invention, it is possible to increase the strengths at 17 hours significantly, and this allows the structure produced to have its shuttering removed sooner, this being at a relatively low ambient temperature which represents a working condition renowned for its difficulty.

EXAMPLE 2

Results Obtained with a Fluid Mortar

I—Experimental Procedures Adopted

The tests were carried out on a specific mortar formulation approaching that of a concrete in respect of the ratio wetting surface of the cement/wetting surface of the granulates and of the water/cement ratio.

Additional validating experiments were also done on standardized mortar.
  a) Mortar composition
    CPA HP Origny cement: 350 g
    standardized sand: 1350 g
    water q.s. for a W/C ratio of 0.6 and W/C of 0.7.

The workability measurements are carried out on a mortar whose formulation is as close as possible to that of a fluid concrete.
  b) Mixing procedure
    cement alone: mixing at low speed for 30 seconds
    sand addition: mixing at low speed for 30 seconds
    addition of water and of agents or adjuvants: mixing at high speed for 2 minutes
    total time: 3 minutes.
  c) Workability measurement
    Every fifteen minutes, the spreading of a conical frustum of mortar is measured
      before (on some tests)
      and after having been subjected to fifteen shocks on the impact table.
    Between each measurement the mortar is mixed at low speed in the vessel of the Rilem mixer.
    The test is stopped when the mortar adopts the consistency of wet earth, that is to say when it is no longer possible, after fifteen shocks, to measure a diameter, the "biscuit" having fragmented.
  d) Strength measurement
    When the mortar fragments, 40 mm×40 mm×160 mm test pieces are cast. Their flexural and compressive tensile strengths are measured at 16 hours or at 24 hours or 28 days after the tests. An Adamel DY 25 press is employed for this purpose.

In the case of strengths at 28 days the test pieces are immersed until 2 hours before the test.

II—Results of the Tests Carried Out with the Product A in Accordance with the Invention In all the tests carried out the adopted dosage is 0.08% of the weight of cement (CPA HP Origny).

1) Workability Tests. Influence of the Water Dosage

Two dosages were adopted, equivalent to W/C ratios of 0.6 and 0.7. The results obtained are presented in FIGS. 1 and 2 which show the spreading in centimeters as a function of time in minutes both in the case of the control mortar and in the case of the mortar to which 0.08% of the product A in accordance with the invention was added.

These results show that with a W/C ratio=0.6 the use of 0.08% of the product A makes it possible to increase the workability period by 30 minutes in comparison with the control mortar.

This increase is 60 minutes in the case of the W/C ratio=0.7.

2) Compressive Strength 2.1 Strength at 16 Hours

With the specific mortar test pieces were cast at: t=0, that is to say immediately after mixing, and at t fragmentation, that is to say after fragmentation of the mortar.

The results obtained are presented in Table V.

TABLE V

| | Compressive strengths at 16 hours (MPa) specific mortar W/C = 0.60 | | | |
|---|---|---|---|---|
| | Type of mortar | | | |
| | Control mortar | | Mortar + 0.08% of agent A | |
| Storage temperature | Casting at t = 0 | Casting at t = 30 min (fragmentation) | t = 0 | t = 60 min (fragmentation) |
| 10° C. | 2 | 3.2 | 3.7 | 6.3 |
| 20° C. | 6.2 | 8.5 | 11.9 | 16.2 |

2.2 Strength at 28 Days

The results obtained are brought together in Table VI

TABLE VI

| | Type of mortar | | | |
|---|---|---|---|---|
| | Specific mortar | | | Standardized mortar W/C = 0.5 |
| Characteristics | W/C = 0.5 | W/C = 0.6 | W/C = 0.7 | |
| Without adjuvant | 46 | 43.2 | 39.8 | 52.7 |
| with 0.08% Agent A | 49.2 | 46.1 | 41.1 | 54 |

It may therefore be concluded that the addition of 0.08% of product A in accordance with the invention maintains the strength at 28 days.

2.3 Conclusion

In conclusion, the addition of 0.05% of product A considerably increases the strength at 16 hours and maintains that at 28 days.

3) Influence of the Storage Temperature on the Strength at 16 Hours (MPa)

The results of the tests are brought together in Table VII.

TABLE VII

| Storage temperature | Adjuvant addition | Specific mortar | | | Standardized mortar |
|---|---|---|---|---|---|
| | | W/C = 0.5 | W/C = 0.6 | W/C = 0.7 | W/C = 0.5 |
| 5° C. | without agent | 0.9 | 0.6 | 0.4 | 0.7 |
| | with 0.08% of agent A | 0.8 | 0.5 | 0.4 | 0.85 |
| 10° C. | without agent | 3.6 | 2.1 | 1.3 | 3.1 |
| | with 0.08% of agent A | 5 | 3.6 | 2.4 | 4.1 |
| 15° C. | without agent | 3.7 | 2.5 | 1.5 | 3.3 |
| | with 0.08% of agent A | 6.2 | 3.9 | 2.6 | 4.4 |
| 20° C. | without agent | 9.4 | 6.3 | 4.6 | 8.7 |
| | with 0.08% | 15.8 | 12.7 | 8.4 | 14.7 |

TABLE VII-continued

| Storage tempera-ture | Adjuvant addition | Specific mortar | | | Standardized mortar |
|---|---|---|---|---|---|
| | | W/C = 0.5 | W/C = 0.6 | W/C = 0.7 | W/C = 0.5 |
| | of agent A | | | | |

In the case of temperatures higher than or equal to 10° C., the use of the product A in a proportion of 0.08% of the weight of cement makes it possible to increase the compressive strengths very significantly, whatever the formulation of the mortar.

It may be concluded, in fact, that the strengths are thus increased by 57% at 10° C., by 58% at 15° C. and by 80% at 20° C.

4) Stoving Tests on the Mortars

In order to represent what can happen in prefabrication, tests were conducted on the specific mortar under the following conditions:
stoving temperature: 40° C.
stoving time: 4, 6, 8 hours
W/C ratio: 0.45 and 0.50.

The compressive strength values obtained appear in Table VIII.

TABLE VIII

Compressive strengths obtained after stoving at 40° C.

| Type of mortar | W/C | Stoving period (hours) | | |
|---|---|---|---|---|
| | | 4 | 6 | 8 |
| without adjuvant | 0.45 | 3 | 11.8 | 14.4 |
| | 0.50 | 1.8 | 10.6 | 12.8 |
| 0.08% of agent A | 0.45 | 4.8 | 14 | 18.3 |
| | 0.50 | 3.4 | 13.5 | 14.6 |

Addition of product A in accordance with the invention is found to be beneficial for the compressive strengths.

An increase in these strengths is observed, in fact, of:
74% with a stoving time of 4 h
23% with a stoving time of 6 h
21% with a stoving time of 8 h.

EXAMPLE 3

I—Study of the Workability of a Specific Mortar at 20° C.

A study is made of the influence of the product A in accordance with the invention on the workability at 20° C. of a specific mortar of the following composition:

| CPA HP Origny cement | 350 g |
|---|---|
| standardized sand | 1350 g |
| water sufficient quantity for a W/C ratio of 0.6 | 210 g |

The product A is dosed at 0.02 and 0.08% of the weight of cement respectively.

The workability is evaluated by measuring the dispersion of a cone of mortar after 15 shocks on the impact table. The results obtained are presented in FIG. 3, which shows the dispersion in centimeters as a function of the time in minutes for the control mortar, for the mortar with the addition of 0.02% of product A and for the mortar with the addition of 0.08% of product A as well.

These results confirm that the use of an agent in accordance with the invention makes it possible to increase significantly the workability period of a mortar.

II—Study of the Mechanical Performance on a Specific Mortar or Concrete at Different Temperatures a) Influence of the aging temperature on the strength at 16 hours (tests on specific mortar)

Two temperatures were fixed: 10° C. and 20° C.

Analysis of the results (Tables X and XI) emphasizes the following points:

1) With T=10° C., an increase in strength of 5% and 70% relative to the reference mortar is observed in the case of the mortars dosed with 0.02 and 0.08% of product A respectively.

2) With T=20° C., an increase in strength approximately of 34% and of 54% relative to the reference mortar is observed in the case of the mortars dosed with 0.02 and 0.08% of product A respectively.

TABLE IX

Influence of the storage temperature (T = 10° C.) on the strength at 16 hours (tests on 4 × 4 × 16 cm³ prisms)

| Adjuvant | None (reference) | Product A | |
|---|---|---|---|
| Dosage | — | 0.02% | 0.08% |
| Sc 16 h (MPa) | 2.0 | 2.1 | 3.4 |

TABLE X

Influence of the storage temperature (T = 20° C.) on the strength at 16 hours (tests on 4 × 4 × 16 cm³ prisms)

| Adjuvant | None (reference) | Product A | |
|---|---|---|---|
| Dosage | — | 0.02% | 0.08% |
| Sc 16 h (MPa) | 12.7 | 17.0 | 19.6 | b) Influence of an aging temperature of 5° C. on the strength of a concrete at 16 hours The tests were performed at 5° C. on a concrete whose formulation is as follows:

| CPA HP cement | 260 kg |
|---|---|
| 0/5 round sand | 800 kg |
| 5/15 gravel | 1100 kg |
| water | determined to obtain an initial slump of 15 cm. |

The strengths (Sc 16 h) were measured on cylinders 11 cm in diameter and 22 cm in height.

The results are assembled in Table XI below.

TABLE XI

Influence of the addition of adjuvant on the strength of the concrete at 16 hours

| Adjuvant | W/C | Sc 16 h (MPa) |
|---|---|---|
| None (reference) | 0.60 | 0.6 |
| 0.02% product A | 0.59 | 0.9 |
| 0.08% product B | 0.58 | 1.0 |

From the results in Tables IX to XI it follows overall that an agent in accordance with the invention such as the product A has a "hardening accelerator" effect on hydraulic binders such as mortars and concretes.

This effect appears to be particularly significant from an aging temperature of 10° C. onwards.

c) Study of the strength at 28 days of a specific mortar stored at 20° C.

Measurements of strength at 28 days (Sc 28 d) were performed on a specific mortar. After demolding at 24 hours of hydration, the test pieces (4×4×16 cm³ prisms) were stored under water at T=20° C. until the 28th day. The results are assembled in Table XII below.

TABLE XII

Influence of the addition of adjuvant on the strength of the mortar at 28 days

| Adjuvant | None (reference) | Product A | |
|---|---|---|---|
| Dosage | — | 0.02% | 0.08% |
| Sc 28 d (MPa) | 53.9 | 55.6 | 60.0 |

From Table XII it follows that, when compared with the reference mortar, the mortars containing the agent in accordance with the invention as adjuvant exhibit an increase in strength at 28 days, this being so including the case of very low adjuvant addition ratios (0.02%/cement).

III—Study of the Dimensional Changes in a Concrete for Slabbing

The dimensional changes were measured within the initial 24 hours on a 7×7×50 cm³ bar, making it possible to evaluate the plastic shrinkage from the beginning of setting.

The concrete formulation adopted is that of a concrete for slabbing, comprising:

| CPJ 45 Vicat cement | 330 kg/m³ |
|---|---|
| round/05 sand | 850 kg/m³ |
| round 5/15 gravel | 1000 kg/m³ |
| water | adjusted to obtain a slump of 15 cm. |

The tests are performed at a temperature T or 20° C. and at relative humidity RH of 50%.

The results obtained are reproduced in Table XIII below.

TABLE XIII

Evaluation of the shrinkage between the beginning of setting and 24 hours

| Adjuvant | W/C | Maximum shrinkage observed in the initial hours (μm/m) | Time after which the maximum shrinkage is reached (h) | Decrease in shrinkage relative to the reference (%) |
|---|---|---|---|---|
| None (ref.) | 0.57 | 140 μm/m | 23 h | — |
| 0.02% product A | 0.57 | 112 μm/m | 23 h | −20% |
| 0.08% of product A | 0.56 | 90 μm/m | 23 h | −36% |

From Table XIII it follows that the agent in accordance with the invention also makes it possible—even at very low incorporation ratios—to reduce very significantly the detrimental phenomenon of shrinkage observed between the beginning of setting and 24 hours in the case of a hydraulic binder of the slabbing concrete type.

IV—Study of Bleeding on a Specific Mortar

The present test consists in measuring the quantity of water which rises to the surface of a specific mortar stored for one hour after its manufacture in a ventilated oven at a temperature T of 50° C. The free surface is 390 cm².

The bleeding ratio is the ratio of the quantity of water recovered to the quantity of mixing water.

The results obtained, which are the average of three measurements, are reproduced in Table XIV below.

TABLE XIV

Influence of the adjuvant and of its incorporation ratio on the bleeding ratio

| Adjuvant | Bleeding ratio (%) | Decrease in the bleeding ratio relative to reference (%) |
|---|---|---|
| None (reference) | 5.6 | — |
| 0.02% of product A | 4.5 | −19.6% |
| 0.04% of product A | 3.0 | −46.4% |
| 0.08% of product A | 1.6 | −71.4% |

From Table XIV it follows that the agent in accordance with the invention also makes it possible to reduce the problems of bleeding. This "antibleeding" effect is all the more significant as the incorporation ratio of product A increases.

V—Study of Permeability on Concrete for Slabbing

Figure 4:
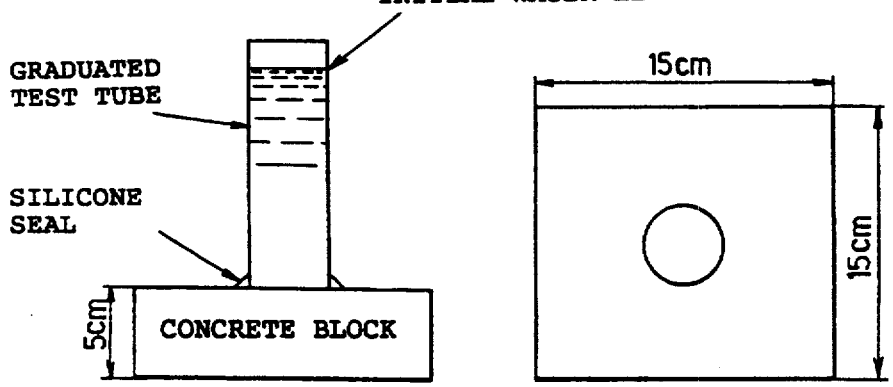
FIG. 4 illustrates the test, used for the measurement of permeability, which consists in measuring the absorption of water, by capillarity, by a block of concrete of the dimensions shown.

The principle of the present test consists in measuring the absorption of water by capillarity by a block of concrete of dimensions 15×15×5 cm³. (Cf. FIG. 4)

The test concrete formulation is that given above in the case of the slabbing concrete (cf. Example 3 III).

Figure 5:
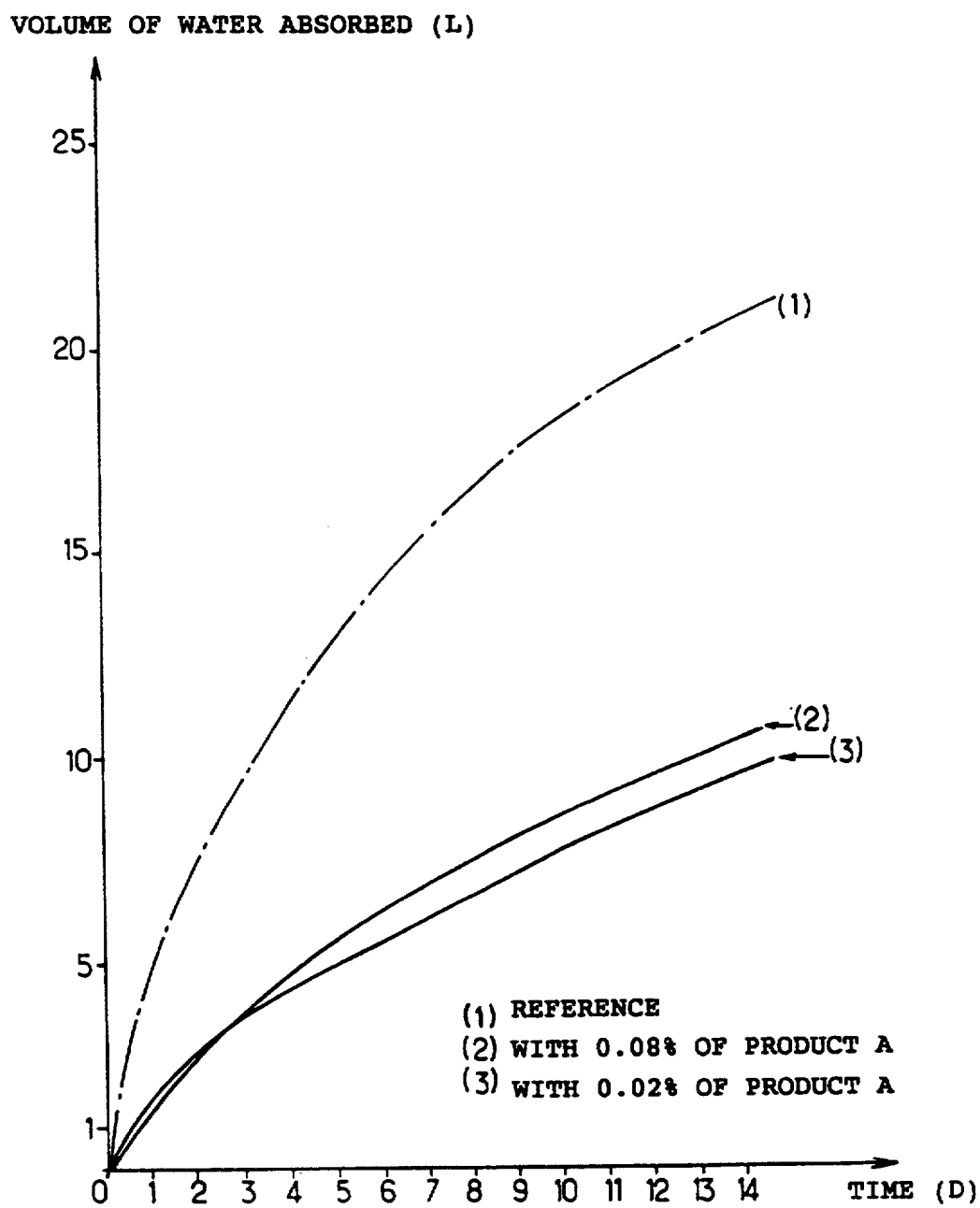
FIG. 5 shows the change in permeability with time, obtained after the addition of different amounts of agent as compared with a reference concrete.

In accordance with FIG. 5 it is observed that, when compared with the reference concrete, the volume of water absorbed by the concretes containing product A as adjuvant is decreased by approximately 50%, this being whatever the incorporation ratio of product A (0.02% or 0.08%/cement).

VI—Conclusion

From all the tests described in the present Example 3 it follows overall that the agents in accordance with the invention, namely agents increasing the rate of hardening of hydraulic binders while maintaining, or even increasing, their workability, exhibit inter alia, the following additional advantages:

they are efficient antisegregation and antibleeding agents, they contribute to decreasing the plastic shrinkage of concretes, they decrease the permeability of concretes.

EXAMPLE 4

The present test is intended to exemplify the possibility of adding the agent in accordance with the invention directly to a cement.

Product A in accordance with the invention is sprayed, with stirring, onto cement of "CPA 55 ET Gorain" type (cement without any adjuvant addition) preheated to 80° C. so that the cement contains 0.0013% of product a (dry/dry). The stirring is continued for 5 minutes. A sample of the cement thus prepared is allowed to cool in a welded plastic pack, this being done for 24 hours.

The cement is then evaluated according to French standard NF 96-1, this being done in comparison with "CPA 55 ET Gorain" cement to which product A has not been added as adjuvant.

The values of beginning and end of setting and hardening period obtained are brought together in Table XV.

TABLE XV

| Adjuvant | Beginning of setting | End of setting | Hardening period |
|---|---|---|---|
| None (reference) | 4 h 15 | 6 h 15 | 2 h 00 |
| 0.0013% product A | 4 h 30 | 5 h 45 | 1 h 15 |

It may be concluded that the agent in accordance with the invention can—this being even at very low doses—be validly incorporated directly into a cement. The hydraulic binder obtained from said cement (mortar with W/C=0.5) exhibits a rate of hardening which is increased in comparison with a hydraulic binder prepared from a cement to which an adjuvant has not been added.

We claim:

1. An adjuvant composition for cement, mortar or concrete, said composition comprising an agent for increasing the rate of hardening of said cement, mortar or concrete while maintaining its workability, said agent having the general formula:

$$\text{HO}-\underset{\underset{R_2}{|}}{\overset{\overset{R_1}{|}}{C}}-\underset{\underset{R_3}{|}}{\overset{\overset{OH}{|}}{C}}-B-A$$

wherein
  $R_1$, $R_2$ and $R_3$, which may be identical or different, denote a hydrogen atom or an alkyl, substituted alkyl, alkene, aryl or alkylaryl group,
  B denotes a hydrocarbon chain containing at least one —$CH_2$— unit and in which the number of carbons situated in the chain is smaller than or equal to 10,
  A denotes one of the groups:

$$-N\underset{R_6}{\overset{R_5}{\diagup}}\ ;\ -N^+\underset{H}{\overset{R_5}{\diagup}}-R_6,\ X^-;\ \text{or}\ -N^+\underset{R_7}{\overset{R_5}{\diagup}}-R_6,\ X^-$$

wherein:
  X denotes an organic or inorganic anion chosen from the group consisting of halogen, nitrate, nitrite, sulfate, sulfite, thiosulfate, acetate, adipate, citrate, gluconate, p-tosylate, formate, propionate, phosphate, borate, thiocyanate and sulfonate,
  $R_5$, $R_6$ and $R_7$, which may be identical or different, denote an alkyl, substituted alkyl, alkene, aryl or alkylaryl group.

2. An adjuvant composition according to claim 1 wherein B has the general formula $(CH_2)_n$ wherein $1 \leq n \leq 6$.

3. An adjuvant composition according to claim 1 wherein X denotes halogen.

4. An adjuvant composition according to claim 2 wherein X denotes halogen.

5. An adjuvant composition according to any one of claims 1-4 wherein $R_1$, $R_2$ and $R_3$ denote $C_1$-$C_4$ alkyl radicals.

6. An adjuvant composition according to any one of claims 1-4 wherein said agent has the general formula:

$$CH_2OH-CHOH-(CH_2)_n-N^+\underset{R_7}{\overset{R_5}{\diagup}}-R_6,\ X^-$$

wherein
  $R_5$, $R_6$ and $R_7$, which may be identical or different, are $C_1$-$C_4$ alkyl radicals, and
  $1 \leq n \leq 5$.

7. An adjuvant composition according to any one of claims 1-4 wherein said agent is present in an amount of from 10-95% by weight, dry weight basis, the balance including at least one other additive for mortar and concrete.

8. An adjuvant composition according to any one of claims 1-4 wherein said agent is present in an amount of from 30-80% by weight, dry weight basis, the balance including at least one other additive for mortar and concrete.

9. A hydraulic cement, mortar or concrete composition comprising an agent for increasing the rate of hardening of the composition while maintaining its workability, said agent having the general formula:

$$\text{HO}-\underset{\underset{R_2}{|}}{\overset{\overset{R_1}{|}}{C}}-\underset{\underset{R_3}{|}}{\overset{\overset{OH}{|}}{C}}-B-A$$

wherein
  $R_1$, $R_2$ and $R_3$, which may be identical or different, denote a hydrogen atom or an alkyl, substituted alkyl, alkene, aryl or alkylaryl group,
  B denotes a hydrocarbon chain containing at least one —$CH_2$— unit and in which the number of carbons situated in the chain is smaller than or equal to 10,
  A denotes one of the groups:

$$-N\underset{R_6}{\overset{R_5}{\diagup}}\ ;\ -N^+\underset{H}{\overset{R_5}{\diagup}}-R_6,\ X^-;\ \text{or}\ -N^+\underset{R_7}{\overset{R_5}{\diagup}}-R_6,\ X^-$$

wherein:
  X denotes an organic or inorganic anion chosen from the group consisting of halogen, nitrate, nitrite, sulfate, sulfite, thiosulfate, acetate, adipate, citrate, gluconate, p-tosylate, formate, propionate, phosphate, borate, thiocyanate and sulfonate,
  $R_5$, $R_6$ and $R_7$, which may be identical or different, denote an alkyl, substituted alkyl, alkene, aryl or alkylaryl group, said agent being present in an amount such that the composition will exhibit an increased rate of hardening in comparison with the same composition without said agent, while maintaining the workability of the same composition without said agent.

10. A composition according to claim 9 wherein B has the general formula $(CH_2)_n$ wherein $1 \leq n \leq 6$.

11. A composition according to claim 9 wherein X denotes halogen.

12. A composition according to any one of claims 9-11 wherein $R_1$, $R_2$ and $R_3$ denote $C_1$-$C_4$ alkyl radicals.

13. A composition according to any one of claims 9-11 wherein said agent has the general formula:

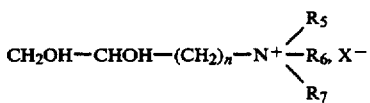

wherein $R_5$, $R_6$ and $R_7$, which may be identical or different, are $C_1$-$C_4$ alkyl radicals, and $1 \leq n \leq 5$.

14. A composition according to any one of claims 9-11 wherein said agent is present in an amount of 0.001 to 2% by weight, dry weight basis, based on the weight of said hydraulic cement, mortar, or concrete.

15. A composition according to claim 14 wherein said agent is present in an amount of 0.01 to 1.5% by weight, dry weight basis.

16. A composition according to claim 14 wherein said agent is present in an amount of 0.015 to 1% by weight, dry weight basis.

* * * * *